US009008951B2

(12) United States Patent
Ide et al.

(10) Patent No.: US 9,008,951 B2
(45) Date of Patent: Apr. 14, 2015

(54) FUEL ADMISSION CONTROL UNIT TO CONTROL A DIESEL ENGINE

(75) Inventors: Kazunari Ide, Nagasaki (JP); Satoshi Iwasaki, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 775 days.

(21) Appl. No.: 12/679,403

(22) PCT Filed: Apr. 21, 2009

(86) PCT No.: PCT/JP2009/058235
§ 371 (c)(1),
(2), (4) Date: Apr. 14, 2010

(87) PCT Pub. No.: WO2009/136562
PCT Pub. Date: Nov. 12, 2009

(65) Prior Publication Data
US 2010/0211295 A1    Aug. 19, 2010

(30) Foreign Application Priority Data

May 8, 2008 (JP) .................................. 2008-122732

(51) Int. Cl.
*B60T 7/12* (2006.01)
*G05D 1/00* (2006.01)
(Continued)

(52) U.S. Cl.
CPC ........ *F02D 41/0065* (2013.01); *F02D 41/0002* (2013.01); *F02D 41/10* (2013.01);
(Continued)

(58) Field of Classification Search
CPC ............ F02D 41/0025; F02D 41/0047; F02D 41/0052

USPC .......... 701/103, 104, 110, 108, 109; 123/568.18, 568.19, 568.21, 480, 571, 123/399, 676, 672; 60/605.2, 285
See application file for complete search history.

(56) References Cited

U.S. PATENT DOCUMENTS 4,185,604 A * 1/1980 Nagaishi et al. .............. 123/536
5,553,575 A    9/1996 Beck et al.
(Continued)

FOREIGN PATENT DOCUMENTS

CN    1187862    7/1998
CN    1245480    2/2000
(Continued)

OTHER PUBLICATIONS

International Search Report issued Jul. 28, 2009 in International (PCT) Application No. PCT/JP2009/058235.
(Continued)

*Primary Examiner* — Stephen K Cronin
*Assistant Examiner* — Sherman Manley
(74) *Attorney, Agent, or Firm* — Wenderoth, Lind & Ponack, L.L.P.

(57) ABSTRACT

A fuel admission control unit controls a diesel engine and ensures compatibility between exhaust gas performance and engine speed response performance by considering residual oxygen in EGR gas. The control unit includes an estimation excess air ratio $\lambda_s$ computing unit that is an arithmetic section to compute an estimation excess air ratio $\lambda_s$, from the quantity of the fuel injected by a fuel injection valve into a cylinder, the intake air flow rate, and the flow rate of the residual oxygen in the EGR gas that returns back into the intake air system. The control unit also includes a fuel admission control unit that controls the fuel flow rate under hard acceleration, based on the estimation excess air ratio $\lambda_s$ that is computed by the estimation excess air ratio $\lambda_s$ computing unit.

11 Claims, 8 Drawing Sheets

(51) Int. Cl.
*G06F 7/00* (2006.01)
*G06F 17/00* (2006.01)
*F02D 41/00* (2006.01)
*F02D 41/10* (2006.01)
*F02D 41/14* (2006.01)

(52) U.S. Cl.
CPC ......... *F02D 41/144* (2013.01); *F02D 41/1458* (2013.01); *F02D 2200/0402* (2013.01); *F02D 2250/38* (2013.01); *Y02T 10/42* (2013.01); *Y02T 10/47* (2013.01)

(56) References Cited

U.S. PATENT DOCUMENTS

| | | | | |
|---|---|---|---|---|
| 5,704,340 | A * | 1/1998 | Togai | 123/676 |
| 5,918,582 | A * | 7/1999 | Itoyama et al. | 123/568.29 |
| 5,938,975 | A | 8/1999 | Ennis et al. | |
| 5,988,138 | A * | 11/1999 | Kadota | 123/305 |
| 6,012,431 | A * | 1/2000 | Itoyama et al. | 123/480 |
| 6,016,788 | A * | 1/2000 | Kibe et al. | 123/399 |
| 6,032,656 | A * | 3/2000 | Itoyama et al. | 123/568.21 |
| 6,095,127 | A | 8/2000 | Kolmanovsky et al. | |
| 6,170,469 | B1 * | 1/2001 | Itoyama et al. | 123/480 |
| 6,230,697 | B1 * | 5/2001 | Itoyama et al. | 123/568.21 |
| 7,270,118 | B2 * | 9/2007 | Yamaoka et al. | 123/672 |
| 7,383,118 | B2 * | 6/2008 | Imai et al. | 701/104 |
| 8,104,457 | B2 * | 1/2012 | Ide et al. | 123/568.18 |
| 2005/0022512 | A1 * | 2/2005 | Shirakawa | 60/285 |
| 2008/0202118 | A1 * | 8/2008 | Ide et al. | 60/605.2 |
| 2010/0211295 | A1 * | 8/2010 | Ide et al. | 701/108 |
| 2010/0282222 | A1 * | 11/2010 | Ide et al. | 123/568.19 |

FOREIGN PATENT DOCUMENTS

| | | |
|---|---|---|
| DE | 102 08 424 | 10/2002 |
| EP | 0 924 417 | 6/1999 |
| EP | 1 024 275 | 8/2000 |
| EP | 1 577 524 | 9/2005 |
| EP | 1 643 103 | 4/2006 |
| EP | 1 862 657 | 12/2007 |
| JP | 60-90950 | 5/1985 |
| JP | 9-126060 | 5/1997 |
| JP | 9-151761 | 6/1997 |
| JP | 09-195825 | 7/1997 |
| JP | 11-36962 | 2/1999 |
| JP | 3341665 | 7/1999 |
| JP | 2001-159356 | 6/2001 |
| JP | 2005-48742 | 2/2005 |
| RU | 2 027 050 | 1/1995 |
| RU | 2 239 078 | 9/2002 |
| RU | 45 468 | 5/2005 |
| RU | 2 243 395 | 4/2007 |

OTHER PUBLICATIONS

Japanese Decision to Grant a Patent dated Mar. 30, 2012 in corresponding Japanese Patent Application No. 2008-122732 with English translation.
Korean Notice of Allowance dated Jul. 2, 2012 in corresponding Korean Patent Application No. 2010-7007772 with English translation.
European Decision to Grant a European Patent dated Aug. 2, 2012 in corresponding European Patent Application No. 09742686.0.
Supplementary European Search Report dated Feb. 4, 2011 in corresponding European Patent Application No. 09742686.0.
International Preliminary Report on Patentability and Written Opinion of International Searching Authority issued Dec. 23, 2010 in International (PCT) Application No. PCT/JP2009/058235.
Russian Office Action having a date of Apr. 28, 2011 in corresponding Russian Patent Application No. 2010114261/07 with English translation.
Partial European Search Report issued Jul. 14, 2014 in corresponding European Patent Application No. 11186662.0.
Extended European Search Report issued Nov. 18, 2014 in corresponding European Patent Application No. 11186662.0.
Chinese Notice of Allowance issued Oct. 13, 2014 in corresponding Chinese Patent Application No. 200980100675.0 with English translation.

* cited by examiner

FUEL ADMISSION CONTROL UNIT TO CONTROL A DIESEL ENGINE

TECHNICAL FIELD

The present invention relates to a fuel admission control unit to control a diesel engine that is provided with an EGR (an Exhaust Gas Re-circulation) system by which a part of exhaust gas is returned as EGR gas to an air intake system of the diesel engine.

BACKGROUND ART

The EGR (Exhaust Gas Re-circulation) method is known as a technology that is used for reducing problematic NOx (nitrogen oxide) in exhaust gas emitted from a diesel engine. On the other hand, when the EGR method is applied, the amount of a fresh air (a fresh intake air flow rate) inhaled by the engine decreases relatively which is prone to cause an $O_2$-deprived (oxygen-deprived) atmosphere in a combustion chamber of the engine when the engine is rapidly accelerated or a fuel admission opening of the engine is rapidly increased.

In order to overcome the above-mentioned difficulty, increasing the amount of the fresh intake air by constraining EGR gas flow rate seems to be a possible countermeasure. However, since control response speed as to an EGR system is slower, controlling the EGR gas flow rate is not enough, and thus, it is required to provide a countermeasure as to a fuel injection system control which has a faster control response speed.

However, it must be taken into consideration that the fuel admission (accelerator opening) control independent of engine load control or engine speed control may hinder the engine speed stability. In other words, ensuring compatibility between the exhaust gas performance and the engine speed response performance is a technical prerequisite.

For instance, a patent reference 1 (JP1999-36962) discloses a fuel admission control method by which the amount of exhaust gas smoke of a diesel engine produced when accelerated does not exceed a target density. In the method of the reference 1, a maximum fuel mass quantity in relation to the fresh intake air flow rate and the engine rotation speed, whereby the exhaust gas smoke is not produced, is set as a map in advance, and with the determined maximum fuel mass quantity based on the detected fresh intake air flow rate and the detected engine rotation speed, production of the exhaust gas smoke is controlled.

Further, a patent reference 2 (JP1997-151761) discloses an injection annealing control in which the fuel flow rate is gradually increased with a constant increment to a constant increment, while an EGR valve opening is controlled, so that the exhaust gas smoke due to the slow response of the EGR system is not produced during the engine acceleration, and the performance of the engine acceleration is kept satisfactory. However, in the technology of the patent reference 1, a lot of man-hours are required in creating the above-mentioned map that prescribes a maximum fuel mass quantity; on the other hand, in the control technology of the patent reference 2, there is no consideration as to residual $O_2$ (oxygen) in the EGR gas that returns back into the combustion chamber (or the intake air system of the engine) from the engine exhaust system, although the residual O2 (or the residual air that is not used in burning fuel) that has not been consumed in the former engine combustion stroke has an essential effect on the smoke yielding in the next combustion stroke.

SUMMARY OF THE INVENTION

In view of the above-stated conventional technologies and anticipated solutions thereof, the present disclosure aims at providing a fuel admission control unit to control a diesel engine, with which ensuring compatibility between the exhaust gas performance (not excessive exhaust temperature performance, lower smoke emission, lower NOx emission and so on) and the engine speed response performance is achieved by a simple control with a consideration of the residual oxygen in the EGR gas In order to achieve the goals as mentioned, the present specification discloses a fuel admission control unit to control a diesel engine, the engine having an EGR system that returns a part of the engine exhaust-gas into an intake air system of the engine, the fuel admission control unit comprising:

an estimation excess air ratio $\lambda_s$ computing means that is an arithmetic section to compute an estimation excess air ratio $\lambda_s$ from a quantity of fuel injected by a fuel injection valve into a cylinder, an intake air flow rate measured by an air flow meter, and a flow rate of residual oxygen in the EGR gas that flows back to the intake air system; and a fuel admission control means that controls a fuel flow rate under a quick acceleration, based on the estimation excess air ratio $\lambda_s$ that is computed by the estimation excess air ratio $\lambda_s$ computing means.

According to the invention such as the above, the estimation excess air ratio $\lambda_s$ computing means calculates the estimation excess air ratio $\lambda_s$ by use of the quantity of the fuel injected by the fuel injection valve into the cylinder, the intake air flow rate measured by the air flow meter, and the flow rate of the residual air (the not-consumed air) in the EGR gas that returns back into the intake air system; thus, the estimation excess air ratio $\lambda_s$ is calculated in consideration of the residual oxygen (the oxygen which is not used for the combustion in the cylinder, and returns back into the intake air passage) that has an impact on the engine smoke emission.

Further, since the accelerator opening (the fuel admission) is controlled based on the estimation excess air ratio $\lambda_s$, the control can be performed so that the oxygen ratio in the cylinder air or gas can be reflected on the control. Thus, even when a hard acceleration (a rapid increase as to the accelerator opening) is performed during the EGR system operation, the smoke emission, the NOx emission, and the engine speed response deterioration due to the oxygen shortage in the combustion chamber can be restrained.

Moreover, it is preferable that the fuel admission control means of the present invention is provided with an accelerator opening controlling means by which a rate of change of the accelerator opening is limited lower than or equal to a predetermined value when the estimation excess air ratio $\lambda_s$ computed by the estimation excess air ratio $\lambda_s$ computing means is lower than or equal to a prescribed level.

According to the above invention, when the estimation excess air ratio $\lambda_s$ exists in a range lower than or equal to a constant value, the accelerator opening controlling means limits the rate of change of the accelerator opening so that the rate of change does not exceed a limitation level; thus, even when a hard acceleration (a rapid increase as to the accelerator opening) is performed during the EGR system operation, the smoke emission deterioration due to the oxygen shortage in the combustion chamber, the NOx emission deterioration, and the engine speed response deterioration can be restrained.

According to a preferable example of the above aspect, the accelerator opening controlling means uses a predetermined table that prescribes the relation between the estimation excess air ratio $\lambda_s$ and the maximum rate of change of the accelerator opening.

According to the above example, the allowable maximum limit as to the rate of change of the accelerator opening can be easily adjusted by arranging the predetermined relation table that prescribes the relation between the estimation excess air ratio $\lambda_s$ and the maximum allowable accelerator opening. Therefore, the trade-off relation between the smoke emission and the engine speed response can be easily adjusted.

According to a preferable aspect of the present invention, the fuel admission control means is provided with an accelerator opening controlling means by which the accelerator opening is controlled so that the estimation excess air ratio $\lambda_s$ computed by the estimation excess air ratio $\lambda_s$ computing means tracks a target excess air ratio $\lambda_m$ that is pre-programmed or prescribed.

According to the above aspect, the control unit is provided with the accelerator opening controlling means, whereby the accelerator opening is corrected (amended in a feedback system) so that the prescribed target excess air ratio $\lambda_m$ is followed up by the estimation excess air ratio $\lambda_s$ which is calculated by the estimation excess air ratio $\lambda_s$ computing means; thus, a finer control as to the rate of change of the acceleration opening is performed in the second embodiment than in the first embodiment; in this way, the estimation excess air ratio $\lambda_s$ is accurately controlled so that the air or oxygen content in EGR gas is taken into consideration, whereby the air or oxygen content has a direct influence on the smoke emission level. As a result, the engine smoke emission can be restrained.

Moreover, in a transient state during acceleration, the EGR valve is closed for the purpose of either smoke reduction or response improvement; in closing the valve, the air or gas condition in the inlet manifold varies so that the combustion temperature and the NOx emission level increase. This difficulty can be solved by the above invention, since the estimation excess air ratio $\lambda_s$ can be accurately controlled, the EGR valve can be moderately (not rapidly) closed, and the estimation excess air ratio $\lambda_s$ can be controlled through a quick response of the fuel injection control (the fuel admission control). Therefore, smoke restraint together with NOx reduction can be achieved.

According to a preferable aspect of the present invention, the fuel flow rate is controlled under a condition that the rate of change of the accelerator opening exceeds a prescribed level under the quick acceleration, as well as under a condition that the rate of change of the accelerator opening is not less than another prescribed level.

According to the above aspect, the engine can be free from the across-the-board fuel limitation (the indiscriminate limitation) during a high load operation where the excess air ratio is low.

According to a preferable aspect of the present invention, the fuel admission control unit comprises, as a substitute of the estimation excess air ratio $\lambda_s$ computing means, an oxygen concentration meter that detects the oxygen concentration of an intake air passage at the down stream side of the position where an EGR passage joins the intake air passage, and the fuel flow rate under quick acceleration is controlled based on the oxygen concentration detected by the oxygen concentration meter.

According to the above aspect, the oxygen concentration in the gas including the intake air and the EGR gas is directly detected by means of the oxygen concentration meter which is installed at the inlet manifold that is an air or gas passage at the down stream side of the confluence as to the EGR passage and the intake air passage; the fuel injection control (the fuel admission control) is performed so that the detected oxygen concentration is reflected on the control; thus, the fuel injection control can be simplified in comparison with the before-described manner in which the intake gas pressure and temperature are detected so that the estimation excess air ratio $\lambda_s$ is calculated through the predetermined formulae.

In addition, the reduction of the oxygen concentration is directly evaluated whereby the reduction causes the engine smoke emission; thus, the fuel injection control which reflects the reduction of the oxygen concentration can surely restrain the smoke emission.

As described above, the present invention can provide a fuel admission control unit to control a diesel engine, whereby the control is simple; even the residual oxygen in the EGR gas is taken into consideration; the exhaust gas performance is compatible with the engine speed response performance.

DETAILED DESCRIPTION OF THE INVENTION

Hereafter, the present invention will be described in detail in consultation with the embodiments shown in the figures. However, the dimensions, materials, shape, the relative placement and so on of a component described in these embodiments shall not be construed as limiting the scope of the invention thereto, unless especially specific mention is made.

Figure 1:
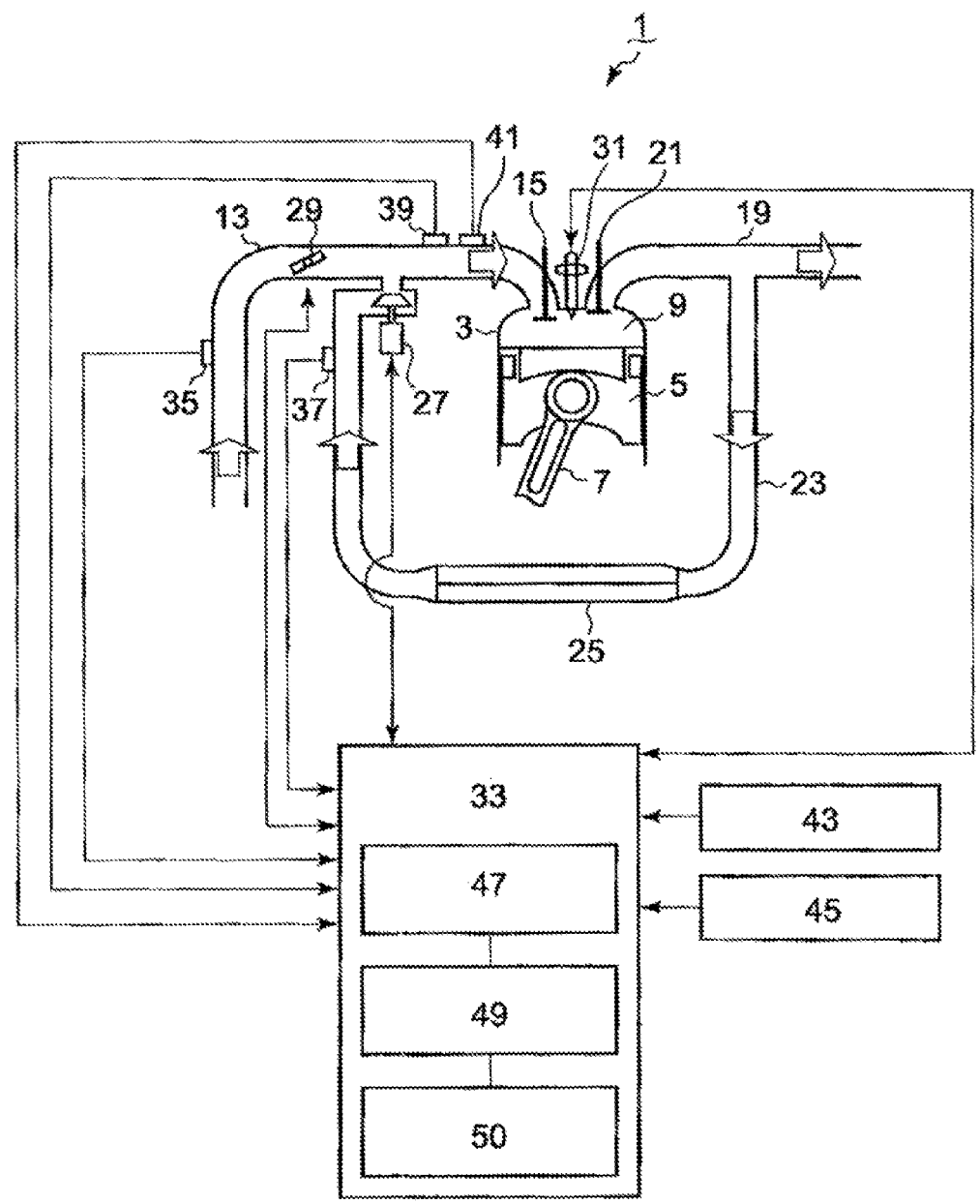
FIG. 1 is a configuration diagram showing the whole configuration of a fuel control unit for a diesel engine according to the first embodiment of the present invention.

FIG. 1 is a configuration diagram showing the whole configuration of a fuel control unit for a diesel engine according to the first embodiment of the present invention. As depicted in FIG. 1, a diesel engine 1 of a four stroke cycle is provided with a piston 5 that performs a reciprocating motion in a cylinder 3 so that the outer periphery of the piston 5 slides on the inner wall of the cylinder 3, and a crankshaft (not shown) connected to the piston 5 via a connecting rod 7, through which the reciprocating motion of the piston 5 is converted into a rotational movement.

In the engine 1, a combustion chamber 9 is formed over the top surface of the piston 5 and within the inner surface of the cylinder 3; an intake air passage 13 is connected to the combustion chamber 9 via an intake air port that is opened and closed by an intake valve 15. Further, an exhaust gas passage 19 is connected to the combustion chamber 9 via an exhaust gas port that is opened and closed by an exhaust valve 21.

On a part way of the exhaust gas passage 19, an EGR (Exhaust Gas Re-circulation) passage 23 is branched so as to merge with the intake air passage 13 at the down stream side of an intake air throttle valve 29. On the EGR passage 23, an EGR cooler 25 that cools the EGR gas stream in the EGR passage 23 is provided, and, at the downstream side of the EGR cooler 25, an EGR valve 27 is also provided for regulating the flow rate of the EGR gas.

The opening of the intake air throttle valve 29 is controlled so as to regulate the flow rate of the intake air inhaled into the combustion chamber 9. In the case of diesel engines, the opening of the intake air throttle valve 29 is operated in the direction that closes the intake air throttle valve 29 when an EGR control is performed, but usually, the throttle valve 29 is kept in its fully opened condition, and excess air ratio is controlled by the fuel flow rate.

A fuel injection valve 31 is installed in each cylinder of the engine 1 for injecting fuel pressurized by a fuel injection pump (not shown) into the combustion chamber 9, and the fuel amount per shot and the injection timing are controlled by a control unit (a fuel admission control means) 33. The control unit 33 also controls the fuel injection timing so that the fuel is injected at a predetermined point of time; in general, the injection timing can be variably controlled.

An air flow meter 35 that measures the flow rate of the fresh intake air which is inhaled into the combustion chamber 9 is fitted on a part way of the intake air passage 13, upstream to the air throttle valve 29; from the air flow meter 35, signals as to the flow-rate of the fresh air are inputted into the control unit 33. Similarly, an EGR gas flow meter 37 that measures the (volume) flow rate of the EGR gas which streams into the intake air passage 13 from the EGR gas passage 23 is fitted on a part way of the EGR gas passage 23, upstream to the EGR valve 27; from the EGR gas flow meter 37, the signals as to the flow-rate of the EGR gas are inputted into the control unit 33.

Further, the engine is provided with an inlet manifold pressure sensor 39 that detects pressure in an inlet manifold of the engine, and an inlet manifold temperature sensor 41 that detects temperature in the inlet manifold; from the sensors 39 and 41, pressure signals and temperature signals are inputted into the control unit 33.

Further, signals from an engine speed sensor 43 which detects engine speed, and an accelerator sensor 45 which detects the stepping amount on the accelerator or the operation amount of accelerator-wheels, etc. are inputted to the control unit 33.

Hereinafter, the control unit 33 is explained. The control unit 33 according to the first embodiment comprises an estimation excess air ratio $\lambda_s$ computing means 47 that is an arithmetic section to compute an estimation excess air ratio $\lambda$ in the cylinder 3 from the quantity of the fuel injected by the fuel injection valve 31 into the cylinder 3, the intake air flow rate measured by the air flow meter 35, and the flow rate of the residual oxygen in the EGR gas that flows back to the intake air passage 13.

Further, the control unit 33 comprises an estimation excess air ratio $\lambda_s$ evaluating means 49 that is an arithmetic section to evaluate whether the estimation excess air ratio $\lambda_s$ which is computed by the estimation excess air ratio $\lambda_s$ computing means 47 is smaller than or equal to a threshold value or not, and when the estimation excess air ratio $\lambda_s$ evaluating means 49 evaluates that the estimation excess air ratio $\lambda_s$ is lower than or equal to the threshold value, an accelerator opening controlling means 50 provided in the control unit 33 limits the rate of change of the accelerator opening below a predetermined value.

Figure 2:
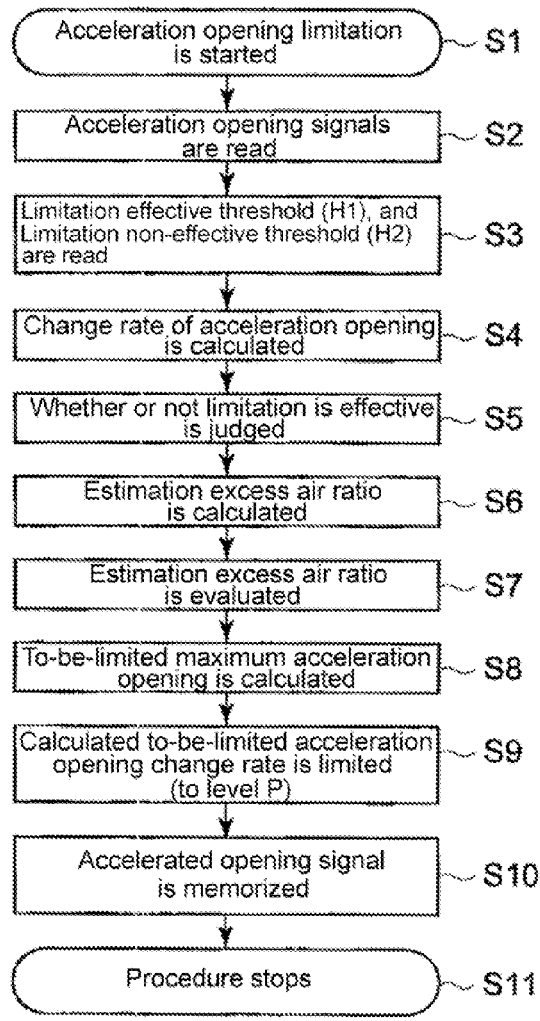
FIG. 2 is a control flow chart of the control unit according to the first embodiment.

In connection with a flow chart in FIG. 2, a control procedure as to the limitation of the accelerator opening in the control unit 33 is now explained.

Figure 4:
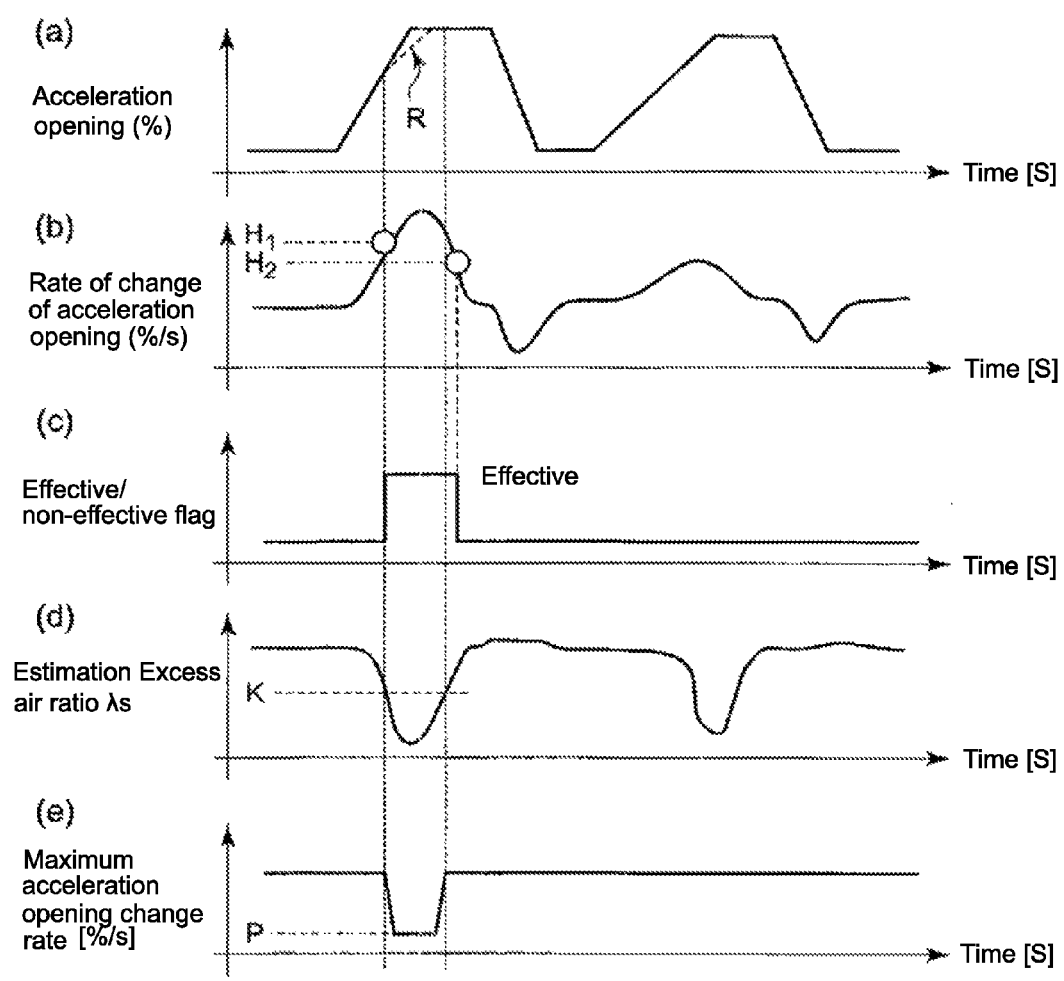
FIGS. 4 (a) to 4(e) are characteristic curves conceptually showing a control flow according to the first embodiment.

After an accelerator opening limitation process is started at Step S1, an accelerator-opening signal is read into the unit 33 at Step S2. The accelerator-opening signal changes on an hour-by-hour basis, as depicted in FIG. 4, thereby, the accelerator-opening signal starts from an incipient fixed opening so as to rise with a slope. At the next step S3, threshold values H1 and H2 as to the rates of changes of the accelerator opening are read in order to determine whether the accelerator opening is to be limited or not. If the rate of change of the accelerator opening is greater than or equal to the value H1, then the limitation is held under an ON (limitation ON) condition, and if the rate of change is equal to or lower than H2, the limitation is held under an OFF (limitation OFF) condition. Hereby, an condition H1>H2 is set so that an unstable behavior as to the accelerator opening or the rate of change thereof can be prevented. The unstable behavior hereby means a hunting phenomenon of the threshold value.

In Step S4, the rate of change of the accelerator opening is calculated based on the accelerator-opening signals that have been read in at Step S2. The rate of change of the accelerator opening corresponds to the slope (the gradient) of the accelerator-opening curve (line) as depicted in FIG. 4(a); this rate of change is obtained as a curve such as depicted in FIG. 4(b). However, it is hereby noted that FIG. 4(b) is not an example as a differential of the function of FIG. 4(a); namely, FIGS. 4(a) and (b) are only the examples for explaining the terms.

In Step S5, based on the threshold values H1 and H2, the control unit 33 determines whether the accelerator opening is to be limited or not. More specifically, when the rate of change of the accelerator opening is greater than or equal to the value H1, the control unit 33 determines that the limitation is to be effective, on the other hand, when the rate of change of the accelerator opening becomes lower than or equal to the value H2, then the control unit 33 determines that the limitation is to be ineffective; accordingly, an effective flag or an ineffective flag is set. In FIG. 4(c), an example of the effective flag in a form of a rectangular step protrusion is shown.

In this way, only when the rate of change of the accelerator opening is greater than or equal to an constant value, the accelerator opening limitation is performed. Therefore, the engine can be free from the across-the-board fuel limitation (the indiscriminate limitation) even during a high load operation where the excess air ratio is low.

In Step S6, the estimation excess air ratio $\lambda_s$ is calculated by the estimation excess air ratio $\lambda_s$ computing means 47 by the use of the following formulae (1) and (2):

$$\lambda_s = \frac{G_a + G_{egra}}{G_f \cdot L_{th}} \quad (1)$$

$$G_{egra} = \frac{G_{egr}(\lambda_s(n-1)-1) \cdot G_f \cdot L_{th}}{G_a + G_f + G_{egr}} \quad (2)$$

whereby, $G_a$ is an intake air mass flow rate;
$G_{egr}$ is an EGR gas mass flow rate;
$G_{egra}$ is an air mass flow rate in the EGR gas flow rate;
$G_f$ is a fuel mass quantity injected in a shot;
$L_{th}$ is a theoretical air-fuel ratio; and
(n−1) is an index that refers to the former calculation step as to the former data sampling cycle.

The intake air mass flow rate $G_a$ in the formula (1) is calculated by use of a detected signal from the air flow meter 35; the EGR gas mass flow rate $G_{egr}$ is calculated through numerical computations based on the EGR gas flow rate detected by the EGR gas flow meter 37 or a measurement as to the pressure drop of the EGR gas through the EGR cooler 25. Hereby, it is noted that the unit as to the pressure drop measurement is not shown in the attached drawings.

The air mass flow rate $G_{egra}$ in the EGR gas flow rate is estimated by use of the calculation result obtained in the former step as to the former data samplings, using the formula (2). Here, the calculation result means a result of the estimation excess air ratio $\lambda_s$.

Figure 3:
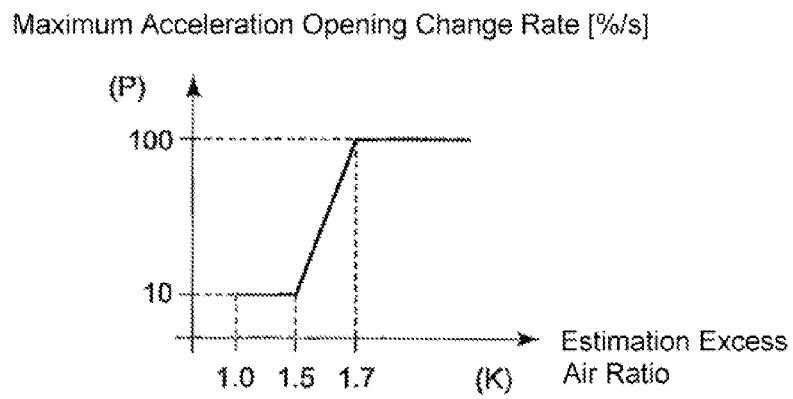
FIG. 3 is a diagram showing the to-be-limited maximum rate of change of the accelerator opening with respect to the threshold values as to the estimation excess air ratio.

In Step S7, the estimation excess air ratio $\lambda_s$ evaluating means 49 makes a judgment as to whether or not the calculated estimation excess air ratio $\lambda_s$ is smaller than or equal to a threshold value K as to the estimation excess air ratio. In a case where the estimation excess air ratio $\lambda_s$ is smaller than or equal to the threshold value K, Step 8 is carried out in which the to-be-limited maximum rate of change of the accelerator opening is calculated in response to the estimation excess air ratio $\lambda_s$. It is hereby noted that the mentioned threshold value K is a variable corresponding to the estimation excess air ratio $\lambda_s$ rather than a constant value; thus, the to-be-limited maximum rate of change of the accelerator opening calculated in step S8 is predetermined as a function of the estimation excess air ratio $\lambda_s$ or a function of the variable K. In the next step S9, the to-be-limited maximum rate of change of the accelerator opening calculated in the step S8 is limited within a limit value (function) P as shown in FIG. 3. Further, in Step S10, allowable maximum limit values in response to the ratio $\lambda_s$ or the variables K are memorized so that the allowable maximum limit values are used as control (command) signals. Then, a chain of steps in the accelerator opening limitation process finishes at Step 11.

The limiting process of the maximum rate of change of the accelerator opening in the steps S9 and S10 is carried out by the accelerator opening controlling means 50 of the control unit 33.

As shown in FIG. 4(d), since the fuel admission level becomes excessive and the engine is prone to emit smoke when the estimation excess air ratio $\lambda_s$ becomes smaller than or equal to a threshold value K, the maximum rate of change of the accelerator opening is decreased to be within a limit value P as shown in FIG. 4(e).

In addition, the threshold variable K as to the estimation excess air ratio $\lambda_s$ and the limit value (function) P as to the maximum rate of change of the accelerator opening are predetermined in a form of a table that can be depicted in a figure such as FIG. 3.

As depicted in the table function of FIG. 3, as the threshold variable K as to the estimation excess air ratio $\lambda_s$ decreases from 1.7 to 1.5 (namely, as the amount of the fuel increases in comparison with the intake air flow rate), the limit value P as an allowable limit as to the maximum rate of change of the accelerator opening is strongly confined to a smaller level of the P; further, when the threshold variable K becomes smaller than or equal to 1.5, the limit value P is set at a constant value, for example, 10% of a maximum allowable value (100%).

As described above, the mentioned threshold value K as to the estimation excess air ratio is a variable corresponding to the estimation excess air ratio $\lambda_s$ and the variable is related to a limit value P as to the rate of change of the accelerator opening; thus, the limit value P is easily adjusted in relation to the threshold value K as to the estimation excess air ratio by adjusting the table. Therefore, the trade-off relation between the smoke emission and the engine speed response can be easily adjusted.

Since the smoke emission level of the engine can be controlled by only one parameter, namely, the estimation excess air ratio $\lambda_s$, the control logic becomes more simplified and the control adjustment can be simplified in comparison with the case where a plurality of control parameters are introduced.

As described above, according to the first embodiment, the estimation excess air ratio $\lambda_s$ computing means 47 calculates the estimation excess air ratio $\lambda_s$ in the cylinder 3 by use of the following quantities: the quantity of the fuel injected into the cylinder 3, the intake air flow rate fed into the cylinder 3 through the intake air passage 13, and the flow rate of the residual air in the EGR gas returned into the intake air passage 13; thus, the estimation excess air ratio $\lambda_s$ is calculated in consideration of the residual oxygen (the oxygen which is not used for the combustion in the cylinder, and returns back into the intake air passage) that has an impact on the engine smoke emission.

Further, since the accelerator opening (the fuel admission) is controlled based on the estimation excess air ratio $\lambda_s$, the control can be performed so that the oxygen ratio in the cylinder air or gas can be reflected on the control. Moreover, when the estimation excess air ratio $\lambda_s$ exists in a range smaller than or equal to a constant value, the accelerator opening controlling means 50 limits the rate of change of the accelerator opening so that the rate of change does not exceed a limitation level; thus, even when a hard acceleration (a rapid increase as to the accelerator opening) is performed during the EGR system operation, the smoke emission, the NOx emission, and the engine speed response deterioration due to the oxygen shortage in the combustion chamber 9 can be restrained.

The dotted line R in FIG. 4 shows the locus of the accelerator opening after the limitation is performed. When the an effective flag is set (in the ON state), the rate of change of the accelerator opening is limited so that the rate of change does not exceed the limit value P, so the rate of change becomes gentle, and the emitted smoke due to the oxygen shortage in the combustion chamber 9 can be restrained, the emitted NOx can be reduced, and the engine speed response deterioration can be restrained.

Figure 8:
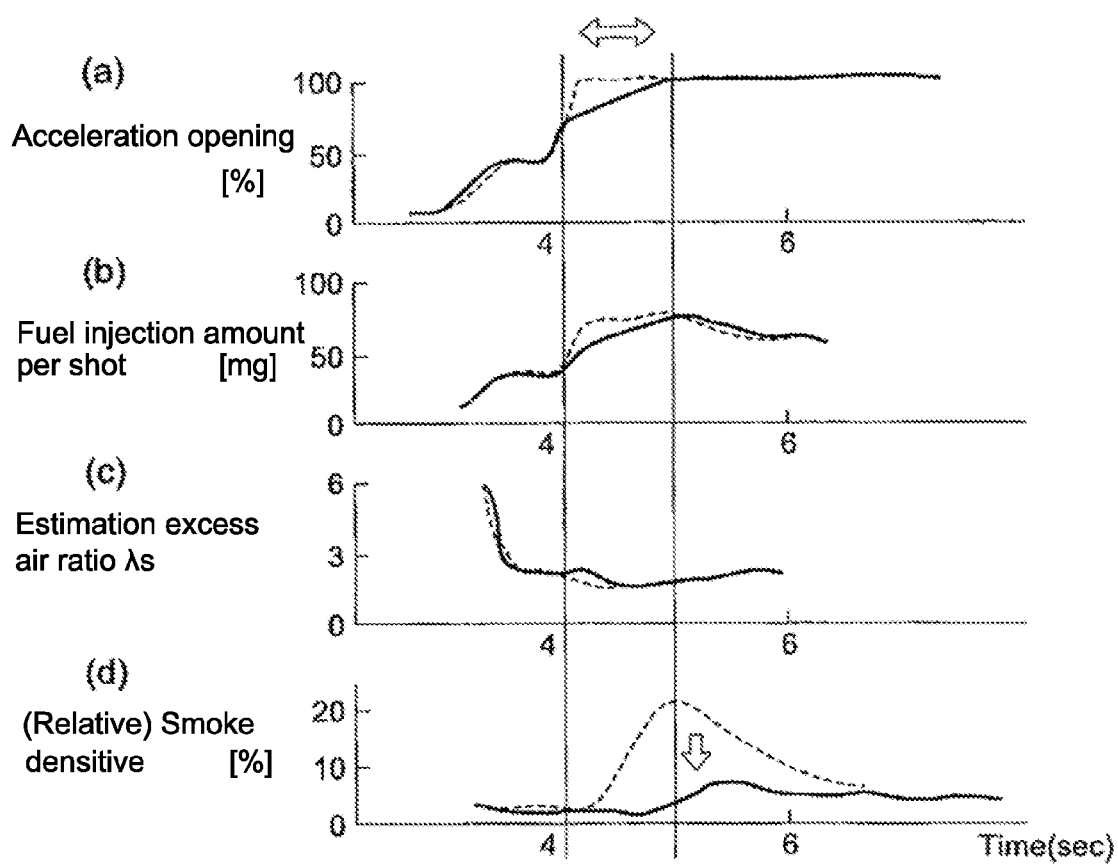
FIGS. 8 (a) to 8(d) are explanatory diagrams explaining a result of the verification test as to the first embodiment.

In addition, FIG. 8(a) to FIG. 8(d) explain a result of the verification test as to the effect of the first embodiment. In FIG. 8(a), the accelerator opening is altered so as to be limited to the solid line; as depicted by the solid line in FIG. 8(b), the fuel injection amount per shot (i.e., the fuel flow rate) is restrained; however, as depicted by the solid line in FIG. 8(c), the estimation excess air ratio $\lambda_s$ changes or increases slightly. As a result, it is confirmed that the smoke emission can be reduced as depicted by the solid line in FIG. 8(d).

Figure 5:
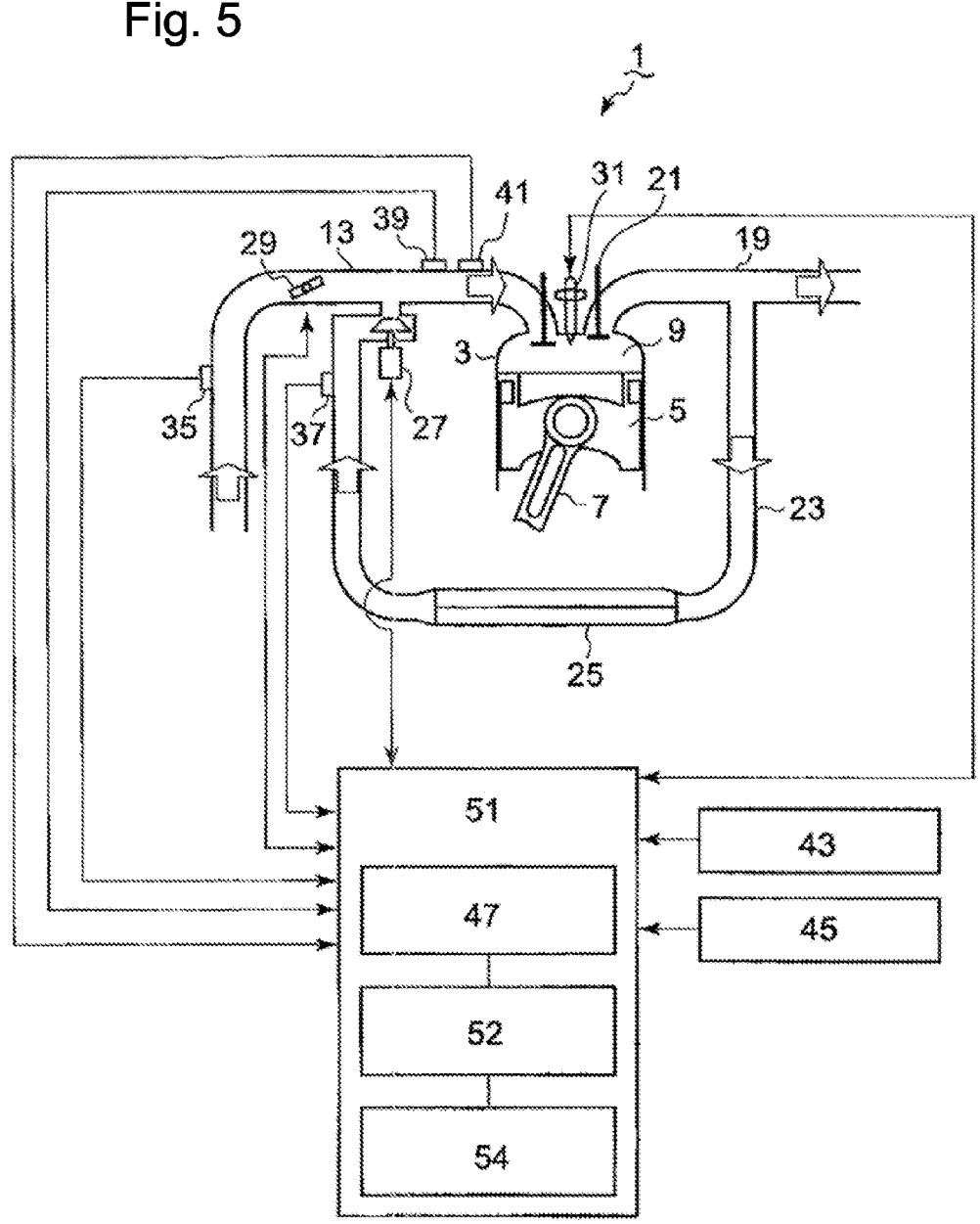
FIG. 5 is a configuration diagram showing the configuration according to the second embodiment of the present invention.
Figure 6:
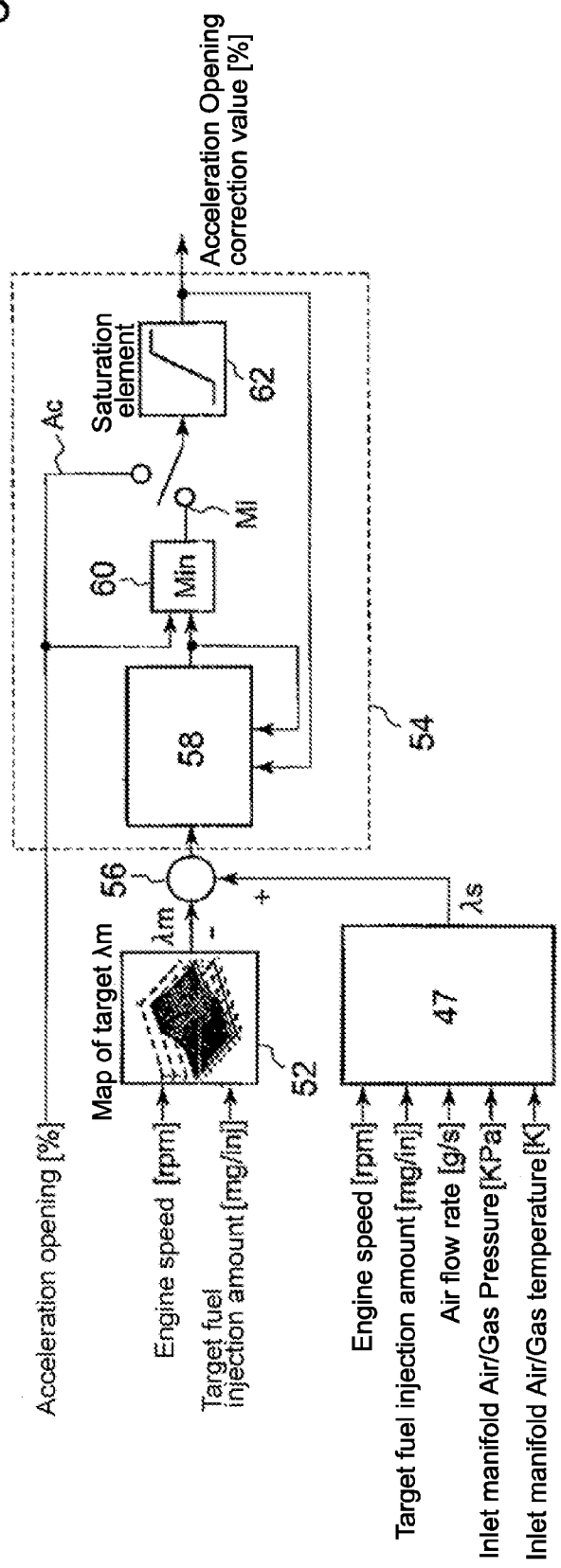
FIG. 6 is a block diagram that shows the configuration of the control unit according to the second embodiment.
Figure 7:
FIG. 7 is a control flow chart for the control unit according to the second embodiment.

Next, in consultation with FIGS. 5 to 7, the second embodiment is now explained. The configuration of the second embodiment is similar to that of the first embodiment; thus, the element in the second embodiment that is equivalent to the element in the first embodiment is given a common numeral, and the explanation as to the common element is omitted.

In the first embodiment, the estimation excess air ratio $\lambda_s$ evaluating means 49 makes a judgment as to whether or not the calculated estimation excess air ratio $\lambda_s$ is reduced, and the accelerator opening controlling means 50 performs a control limitation in relation to the rate of change of the accelerator opening; on the other hand, in the second embodiment the estimation excess air ratio $\lambda_s$ evaluating means 49 is replaced with a target excess air ratio $\lambda_m$ calculating means 52, and the accelerator opening controlling means 50 is replaced with an accelerator opening controlling means 54. In other words, the control unit 33 of the first embodiment comprises the estimation excess air ratio $\lambda_s$ evaluating means 49 and the accelerator opening controlling means 50, while the control unit 51 of the second embodiment comprises the target excess air ratio $\lambda_m$ calculating means 52 and the accelerator opening controlling means 54 as shown in FIGS. 5 and 6. Except the difference of this point, the configuration of the second embodiment is the same as that of the first embodiment.

In FIG. 6, a block diagram of the control unit 51 in the second embodiment is shown; in the target excess air ratio $\lambda_m$ calculating means 52, a map of the target excess air ratio $\lambda_m$ as a function of the engine speed and the target fuel injection amount per shot (i.e. the fuel flow rate) is prescribed. Hereby, in using this map, the engine speed argument and the fuel injection amount argument are set based on the signals detected by the engine speed sensor 43 and the accelerator sensor 45 respectively. Into the map of the target excess air ratio $\lambda_m$ as a to-be-prescribed function, an optimal results (such as obtained by the experiments in advance) can be incorporated; whereby the term optimal relates to an optimal condition in regard to the trade-off relation between the NOx emission and the smoke emission, in every possible engine operation condition.

In the accelerator opening controlling means 54 (in FIG. 5), a feedback control is performed so that the estimation excess air ratio $\lambda_s$ that is calculated by the estimation excess air ratio $\lambda_s$ computing means 47 follows-up the target excess air ratio $\lambda_m$; namely, the ratio $\lambda_s$ tracks the ratio $\lambda_m$ so as to coincide with the ratio $\lambda_m$.

In consultation with the flowchart of FIG. 7, the mechanism of the control unit 51 is now explained.

Firstly, at Step S21, a corrective action as to the accelerator opening starts; in Step S22, a signal as to the accelerator opening is read from the accelerator sensor 45; in Step S23, an engine speed signal and an accelerator opening signal are read by the target excess air ratio $\lambda_m$ calculating means 52; and in Step S24, a target excess air ratio $\lambda_m$ is calculated by means of the map of the target excess air ratio $\lambda_m$.

Secondly, in Step S25, the estimation excess air ratio $\lambda_s$ is calculated by the estimation excess air ratio $\lambda_s$ computing means 47. The calculation is performed by use of the formulae (1) and (2), in the same manner as in the first embodiment. From the estimation excess air ratio $\lambda_s$, the target excess air ratio $\lambda_m$ is subtracted at an adder-subtracter 56 in FIG. 6, and the arithmetic operation result is inputted into a PI controller 58 with an anti-windup compensation function; in the PI controller 58, step S26, namely, the PI control computation is performed. After the step S26, Step S27 (procedure A) in which selecting of a minimum value is performed by a minimum value selector 60 shown in FIG. 6 by comparing the accelerator opening and the output of the PI control computation is carried out.

In procedure B, namely, in Steps S28 to S30, whether the rate of change of the accelerator opening is greater than or equal to a predetermined threshold value or not is estimated, as is the case in the steps S3 to S5 in the first embodiment. Then, the steps as to corrective process (such as Step S32 and/or S33) follow. In Step S31, if the rate of change of the accelerator opening is greater than or equal to the predetermined threshold value, and the fuel input limitation (the accelerator opening limitation) is regarded as effective, then Step S31 is followed by Step S32 in which the output of the process A (the step S27) is set as an accelerator opening correction value; namely, the output Mi from the minimum value selector 60 in FIG. 6 is inputted into a saturation element 62 (a element 62 with saturation).

On the other hand, in Step S31, if the fuel input limitation (the accelerator opening limitation) is regarded as non-effective, then the Step S31 is followed by Step S33 in which the accelerator opening itself is set as an accelerator opening correction value; namely, the signal itself as to the accelerator opening Ac in FIG. 6 is inputted into the saturation element 62 so as to be set as an accelerator opening correction value.

In Step S34 that follows the Step S32 or S33, the signal inputted into the saturation element 62 through which the input signal is saturated; namely, in the element 62, the input signal is converted into a signal so that the output signal does not step across the bounds even when the input signal increases or decreases beyond certain limits. Thus, the output signal as an accelerator opening correction value falls within a range of 0% to 100%. Further, in Step S35, the corrected signal as to the accelerator opening is memorized to be used for a control (command) signal. Thus, a chain of steps in the flowchart (FIG. 7) finishes at Step S36.

According to the second embodiment as described above, since the accelerator opening (the fuel admission) is controlled based on the estimation excess air ratio $\lambda_s$, the control with which the oxygen ratio in the cylinder air or gas is accurately reflected on the control can be performed, as is the case in the first embodiment.

Further, the control unit is provided with the accelerator opening controlling means 54 whereby the accelerator opening is corrected so that the prescribed target excess air ratio $\lambda_m$ is followed up by the estimation excess air ratio $\lambda_s$ which is calculated by the estimation excess air ratio $\lambda_s$ computing means 47; thus, a finer control as to the rate of change of the acceleration opening is performed in the second embodiment than in the first embodiment; in this way, the estimation excess air ratio $\lambda_s$ is accurately controlled so that the air or oxygen content in EGR gas is taken into consideration, whereby the air or oxygen content has a direct influence on the smoke emission level. As a result, the engine smoke emission can be restrained.

In a transient state during acceleration, the EGR valve 27 is closed for the purpose of either smoke reduction or response improvement. However, by closing the valve 27, the air or gas condition in the inlet manifold varies causing the combustion temperature and the NOx emission level increase rapidly. This difficulty can be solved by the second embodiment, since the estimation excess air ratio $\lambda_s$ can be accurately controlled, the EGR valve can be moderately (not rapidly) closed, and the estimation excess air ratio $\lambda_s$ can be controlled through a quick response of the fuel injection control (the fuel admission control). Therefore, smoke restraint together with NOx reduction can be achieved.

Figure 9:
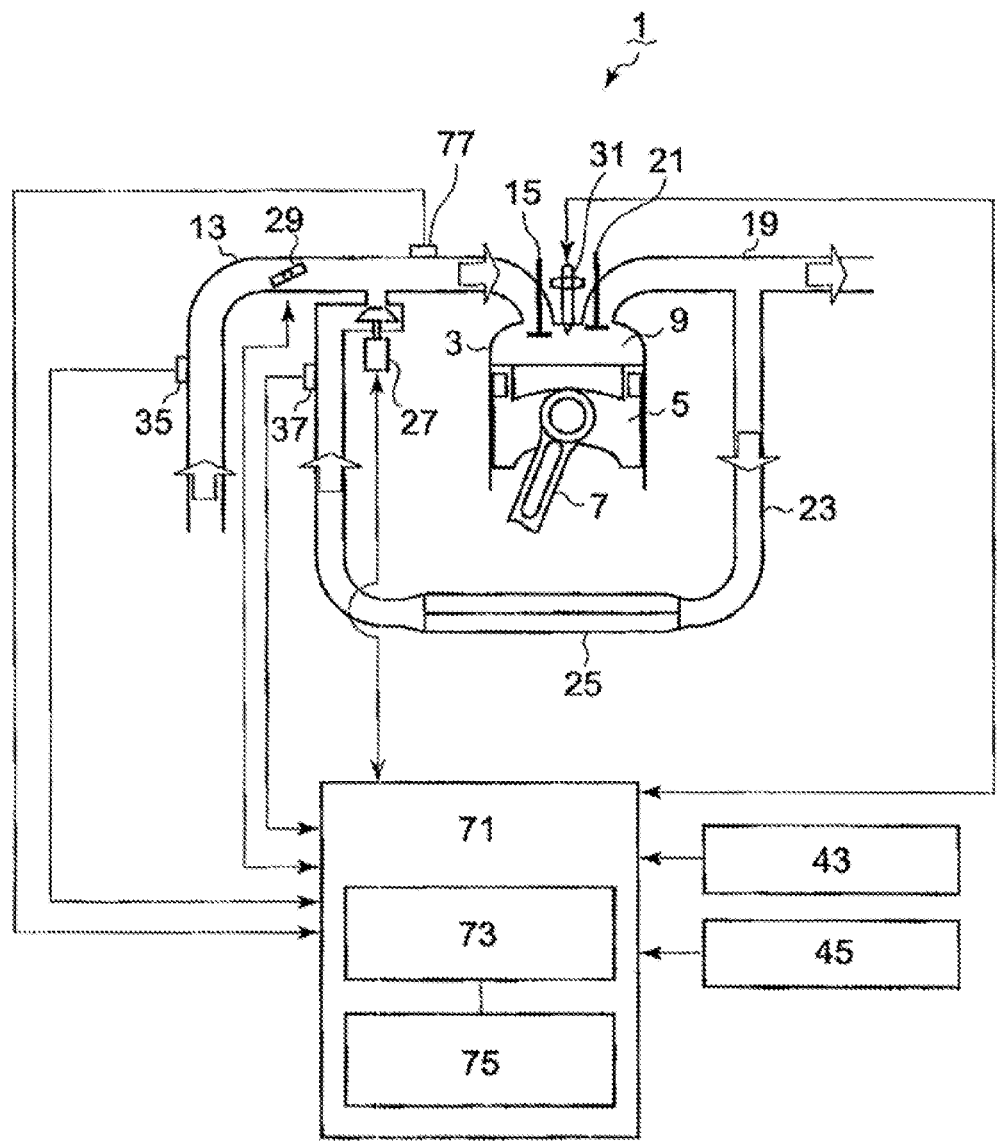
FIG. 9 is a configuration diagram showing the configuration according to the third embodiment of the present invention.

In consultation with FIG. 9, the third embodiment is now explained. The configuration of the third embodiment is similar to that of the first embodiment; thus, the element in the third embodiment that is equivalent to the element in the first embodiment is given a common numeral, and the explanation as to the common element is omitted.

In the first embodiment, the estimation excess air ratio $\lambda_s$ evaluating means 49 makes a judgment as to whether the calculated estimation excess air ratio $\lambda_s$ is reduced or not, and the accelerator opening controlling means 50 performs a control limitation in relation to the rate of change of the accelerator opening; on the other hand, in the third embodiment the estimation excess air ratio $\lambda_s$ evaluating means 49 is replaced with an oxygen concentration evaluating means 73, and the accelerator opening controlling means 50 is replaced with an accelerator opening controlling means 75. In other words, the control unit 33 of the first embodiment comprises the estimation excess air ratio $\lambda_s$ evaluating means 49 and the accelerator opening controlling means 50, while the control unit 71 of the third embodiment comprises the oxygen concentration evaluating means 73 and the accelerator opening controlling means 75 as shown in FIG. 9. Except the difference of this point, the configuration of the third embodiment is the same as that of the first embodiment.

As shown FIG. 9, the engine is provided with an oxygen concentration meter 77 at the inlet manifold that is an air or gas passage at the down stream side of the confluence as to the EGR passage 23 and the intake air passage 13; based on the oxygen concentration measurement, the oxygen concentration evaluating means 73 makes a judgment as to whether or not a detected oxygen concentration value becomes smaller than or equal to a threshold value as is the case in the first embodiment where the estimation excess air ratio $\lambda_s$ evaluating means 49 makes a judgment as to whether the calculated estimation excess air ratio $\lambda_s$ is reduced or not; in the case where the detected oxygen concentration value becomes smaller than or equal to the threshold value, the accelerator opening controlling means 75 controls the command signals as to the accelerator opening so that the rate of change of the accelerator opening does not exceed a limitation value.

According to the third embodiment, the oxygen concentration in the gas including the intake air and the EGR gas is directly detected by means of the oxygen concentration meter 77. The fuel injection control (the fuel admission control) in which the detected oxygen concentration is accurately reflected on the control is performed. Accordingly, the fuel injection control can be simplified in comparison with the before-described manner in which the intake gas pressure and temperature are detected so that the estimation excess air ratio $\lambda_s$ is calculated through the predetermined formulae.

Moreover, as the reduction of the oxygen concentration, which is the cause of the engine smoke emission, is directly evaluated and then controlled, the fuel injection control which reflects the reduction of the oxygen concentration can surely restrain the smoke emission.

In the above explanation from the first to third embodiment, the control command signal is directed to the accelerator opening; however, as a matter of course, the command signal may be any other command signal directed to the fuel injection amount (e.g., in some cases of fuel injection valves, the fuel admission index may be the injection time duration).

INDUSTRIAL APPLICABILITY

According to the present invention, a four-stroke cycle engine with an EGR control unit, in which the engine starting performance such as a quick starting performance is enhanced by being able to avoid a significant descent of speed as to the engine speed during a steady speed operation, can be provided.

The invention claimed is:

1. A fuel admission control unit to control a diesel engine, the diesel engine having an exhaust gas recirculation (EGR) system having an EGR valve, the EGR system returning a part of exhaust-gas of the diesel engine, as EGR gas, into an intake air system of the diesel engine, the fuel admission control unit comprising:
a fuel injector configured to inject a fuel into a cylinder;
an accelerator sensor capable of detecting an accelerator opening signal corresponding to an operation amount of an accelerator;
an estimation excess air ratio $\lambda_s$ computing means that is an arithmetic section configured to compute an estimation excess air ratio $\lambda_s$ from a quantity of the fuel injected by the fuel injector into the cylinder, an intake air flow rate measured by an air flow meter, and a flow rate of residual oxygen in the EGR gas that flows back to the intake air system; and
a fuel admission control means configured to control a fuel flow rate under a quick acceleration, based on the estimation excess air ratio $\lambda_s$ that is computed by the estimation excess air ratio $\lambda_s$ computing means,
wherein the fuel admission control means is configured to control the EGR valve into a closing direction moderately when the estimation excess air ratio $\lambda_s$ computed by the estimation excess air ratio $\lambda_s$ computing means is lower than or equal to a prescribed level and to control the quantity of the fuel injected by the fuel injector based on the accelerator opening signal, and
wherein the fuel admission control means has an accelerator opening signal controlling means configured to use a predetermined table prescribing a relationship between the estimation excess air ratio $\lambda_s$ and a maximum rate of change of the accelerator opening signal so as to limit a rate of change of the accelerator opening signal to be lower than or equal to a predetermined value when the estimation excess air ratio $\lambda_s$ computed by the estimation excess air ratio $\lambda_s$ computing means is lower than or equal to a prescribed level.

2. The fuel admission control unit to control the diesel engine according to claim 1,
wherein the accelerator opening signal controlling means is configured to control the accelerator opening signal so that the estimation excess air ratio $\lambda_s$ computed by the estimation excess air ratio $\lambda_s$ computing means tracks a target excess air ratio $\lambda_m$ that is pre-programmed or prescribed.

3. The fuel admission control unit to control the diesel engine according to claim 2,
wherein the target excess air ratio $\lambda_m$ is preprogrammed or prescribed in regard to an engine speed and a target fuel injection quantity as a function of the engine speed, so as to restrain both smoke emission and NOx emission.

4. The fuel admission control unit to control the diesel engine according to claim 1,
wherein the fuel flow rate is controlled under a condition that the rate of change of the accelerator opening signal exceeds a prescribed level under the quick acceleration, as well as under a condition that the rate of change of the accelerator opening signal is not less than another prescribed level.

5. A fuel admission control unit to control a diesel engine, the diesel engine having an exhaust gas recirculation (EGR) system having an EGR valve, the EGR system returning a part of exhaust-gas of the diesel engine, as EGR gas, into an intake air system of the diesel engine, the fuel admission control unit comprising:
a fuel injector configured to inject a fuel into a cylinder;
an accelerator sensor capable of detecting an accelerator opening signal corresponding to an operation amount of an accelerator;
an oxygen concentration meter configured to detect an oxygen concentration of gas in an intake air passage at a downstream side of a position where an EGR passage joins the intake air passage; and
a fuel admission control means configured to control a fuel flow rate under a quick acceleration, based on the oxygen concentration detected by the oxygen concentration meter,
wherein the fuel admission control means is configured to control the EGR valve into a closing direction moderately when the oxygen concentration detected by the oxygen concentration meter is lower than or equal to a prescribed level and to control the quantity of the fuel injected by the fuel injector based on the accelerator opening signal, and wherein the fuel admission control means has an accelerator opening signal controlling means configured to use a predetermined table prescribing a relationship between the oxygen concentration and a maximum rate of change of an accelerator opening signal so as to limit a rate of change of the accelerator opening to be lower than or equal to a predetermined value when the oxygen concentration detected by the oxygen concentration meter is lower than or equal to a prescribed level.

6. A fuel admission control unit for controlling a diesel engine, the diesel engine having an exhaust gas recirculation (EGR) system having an EGR valve, the EGR system returning a part of exhaust-gas of the diesel engine, as EGR gas, into an intake air system of the diesel engine, the fuel admission control unit comprising:

a fuel injector configured to inject a fuel into a cylinder;

an accelerator sensor capable of detecting an accelerator opening signal corresponding to an operation amount of an accelerator;

an estimation excess air ratio $\lambda_s$ computing unit configured to compute an estimation excess air ratio $\lambda_s$ from a quantity of the fuel injected by the fuel injector into the cylinder, an intake air flow rate measured by an air flow meter, and a flow rate of residual oxygen in the EGR gas that flows back to the intake air system; and a fuel admission controller configured to control a fuel flow rate under a quick acceleration, based on the estimation excess air ratio $\lambda_s$ that is computed by the estimation excess air ratio $\lambda_s$ computing unit, wherein the fuel admission controller is configured to control the EGR valve into a closing direction moderately when the estimation excess air ratio $\lambda_s$ computed by the estimation excess air ratio $\lambda_s$ computing unit is lower than or equal to a prescribed level and to control the quantity of the fuel injected by the fuel injector based on the accelerator opening signal, and wherein the fuel admission controller has an accelerator opening signal controller configured to control a rate of change of the accelerator opening signal based on a predetermined table that prescribes a relationship between the estimation excess air ratio $\lambda_s$ and a maximum rate of change of the accelerator opening signal so as to control the rate of change of the accelerator opening to be lower than or equal to a predetermined value when the estimation excess air ratio $\lambda_s$ computed by the estimation excess air ratio $\lambda_s$ computing unit is lower than or equal to a prescribed level.

7. The fuel admission control unit according to claim 6, wherein the accelerator opening signal controller is configured to control the accelerator opening signal so that the estimation excess air ratio $\lambda_s$ computed by the estimation excess air ratio $\lambda_s$ computing unit tracks a target excess air ratio $\lambda_m$ that is pre-programmed or prescribed.

8. The fuel admission control unit according to claim 7, wherein the target excess air ratio $\lambda_m$ is preprogrammed or prescribed in regard to an engine speed and a target fuel injection quantity as a function of the engine speed, so as to restrain both smoke emission and NOx emission.

9. The fuel admission control unit according to claim 6, wherein the fuel flow rate is controlled under a condition that the rate of change of the accelerator opening signal exceeds a prescribed level under the quick acceleration, as well as under a condition that the rate of change of the accelerator opening signal is not less than another prescribed level.

10. The fuel admission control unit according to claim 1, wherein the predetermined table includes a first threshold value as to the estimation excess air ratio $\lambda s$ and a second threshold value that is smaller than the first threshold value, wherein a preset constant maximum value is selected as a limit value for the maximum rate of change of the accelerator opening signal when the estimation excess air ratio $\lambda s$ computed by the estimation excess air ratio $\lambda s$ computing means is greater than or equal to the first threshold value, wherein a preset constant minimum value is selected as a limit value for the maximum rate of change of the accelerator opening signal when the estimation excess air ratio $\lambda s$ computed by the estimation excess air ratio $\lambda s$ computing means is less than or equal to the second threshold value, and wherein a value decreasing from the preset constant maximum value to the preset constant minimum value in accordance with decreasing the estimation excess air ratio $\lambda s$ is selected as a limit value for the maximum rate of change of the accelerator opening signal when the estimation excess air ratio $\lambda s$ computed by the estimation excess air ratio $\lambda s$ computing means is smaller than the first threshold value and greater than the second threshold value.

11. The fuel admission control unit according to claim 6, wherein the predetermined table includes a first threshold value as to the estimation excess air ratio $\lambda s$ and a second threshold value that is smaller than the first threshold value, wherein a preset constant maximum value is selected as a limit value for the maximum rate of change of the accelerator opening signal when the estimation excess air ratio $\lambda s$ computed by the estimation excess air ratio Xs computing unit is greater than or equal to the first threshold value, wherein a preset constant minimum value is selected as a limit value for the maximum rate of change of the accelerator opening signal when the estimation excess air ratio $\lambda s$ computed by the estimation excess air ratio $\lambda s$ computing unit is less than or equal to the second threshold value, and wherein a value decreasing from the preset constant maximum value to the preset constant minimum value in accordance with decreasing the estimation excess air ratio $\lambda s$ is selected as a limit value for the maximum rate of change of the accelerator opening signal when the estimation excess air ratio $\lambda s$ computed by the estimation excess air ratio $\lambda s$ computing unit is smaller than the first threshold value and greater than the second threshold value.

* * * * *